US011536598B2

(12) United States Patent
Gysling

(10) Patent No.: US 11,536,598 B2
(45) Date of Patent: Dec. 27, 2022

(54) TIME-ACCURATE CFD ENHANCED INTERPRETATION OF STRAIN-BASED FLOW MEASUREMENT

(71) Applicant: Expro Meters, Inc., Wallingford, CT (US)

(72) Inventor: Daniel L. Gysling, South Glastonbury, CT (US)

(73) Assignee: EXPRO METERS INC., Wallingford, CT (US)

( * ) Notice: Subject to any disclaimer, the term of this patent is extended or adjusted under 35 U.S.C. 154(b) by 154 days.

(21) Appl. No.: 16/991,483

(22) Filed: Aug. 12, 2020

(65) Prior Publication Data

US 2021/0048324 A1 Feb. 18, 2021

Related U.S. Application Data

(60) Provisional application No. 62/885,782, filed on Aug. 12, 2019, provisional application No. 62/886,138, filed on Aug. 13, 2019.

(51) Int. Cl.

| | |
|---|---|
| ***G01F 1/66*** | (2022.01) |
| ***G01F 1/36*** | (2006.01) |
| ***G01F 1/667*** | (2022.01) |
| ***G01F 15/00*** | (2006.01) |

(52) U.S. Cl.

CPC ................ *G01F 1/662* (2013.01); *G01F 1/36* (2013.01); *G01F 1/667* (2013.01); *G01F 15/005* (2013.01)

(58) Field of Classification Search

None

See application file for complete search history.

(56) References Cited

U.S. PATENT DOCUMENTS 6,435,030 B1 * 8/2002 Gysling .................. G01F 1/662 73/861.27
7,261,002 B1 * 8/2007 Gysling .................. G01F 1/712 73/861.42
7,661,302 B2 * 2/2010 Gysling .................. G01F 15/08 73/200

(Continued)

FOREIGN PATENT DOCUMENTS

WO 2005088262 A2 9/2005

OTHER PUBLICATIONS

Partial International Search Report for PCT/US2020/045894 dated Oct. 30, 2020.

*Primary Examiner* — Harshad R Patel

(74) *Attorney, Agent, or Firm* — Getz Balich LLC

(57) ABSTRACT

A system for measuring a velocity or volumetric fluid flow rate of a fluid flow passing within a pipe includes a SONAR flow meter configured to determine a measured velocity or volumetric rate of a fluid flow passing within a pipe. The system further includes a CFD analysis device configured to produce a simulated velocity or volumetric rate of the fluid flow passing within the pipe. The system further includes a processing unit in communication with the CFD analysis device and the SONAR flow meter. The processing unit is configured to produce at least one error function based on the measured velocity or volumetric fluid flow rate and the simulated velocity or volumetric fluid flow rate, and is configured to determine an adjusted velocity or volumetric fluid flow rate using the at least one error function and the measured velocity or volumetric fluid flow rate.

19 Claims, 4 Drawing Sheets

(56) References Cited

U.S. PATENT DOCUMENTS

| | | | | |
|---|---|---|---|---|
| 11,105,707 | B2 * | 8/2021 | Gysling | G01M 15/14 |
| 2010/0305882 | A1 * | 12/2010 | Gysling | G01F 1/66 702/47 |
| 2012/0209542 | A1 * | 8/2012 | Gysling | G01F 1/7082 702/45 |
| 2015/0253167 | A1 * | 9/2015 | Gysling | G01F 1/7082 73/861.18 |

* cited by examiner

TIME-ACCURATE CFD ENHANCED INTERPRETATION OF STRAIN-BASED FLOW MEASUREMENT

This application claims priority to U.S. Patent Appln. No. 62/885,782, filed Aug. 12, 2019, and U.S. Patent Appln. No. 62/886,138, filed Aug. 13, 2019, which are herein incorporated by reference in their entireties.

BACKGROUND

1. Technical Field

This disclosure relates generally to fluid flow measurement and, more particularly, to strain-based fluid flow measurement for multiphase fluid systems.

2. Background Information

In certain applications, fluid flow passing within a conduit (generically referred to hereinafter as a "pipe") may contain fluid flow disturbances that convect at or near the average velocity of the fluid flow. These fluid flow disturbances (sometimes referred to as "turbulent eddies" or "vortical disturbances"), are coherent dynamic conditions that substantially decay (by a predetermined amount) over a predetermined distance (or coherence length). These coherent flow disturbances create pressure disturbances that are detectable as a function of strain within the pipe. The passage of coherent flow disturbances within the pipe, and related fluid flow velocity within the pipe, can be determined using a clamp-on, strain-based sonar flow meters sometimes referred to as "passive flow meters". These flow meters measure strain within the pipe at multiple axial locations and then utilize array processing techniques to measure the speed at which coherent disturbances convect past the array of strain-based sensors attached to the pipe.

For single phase, turbulent flows, the velocity of the coherent flow disturbances can be determined and calibrated to the velocity of the fluid flow (and therefore the volumetric fluid flow rate) within the pipe. The relationship between the measured velocity of the convective flow disturbances and the fluid flow velocity through the pipe is a function of many variables including sensor spacing, frequency range, Reynolds number, inlet flow conditions, and other parameters. While the details of the calibration process between the speed of the velocity of the convective flow disturbances and the volumetric fluid flow rate through the pipe is beyond the scope of the disclosure, strain-based sonar meters have demonstrated accuracy to within +/−2% accuracy in volumetric flow for sufficiently-developed, sufficiently turbulent, single phase fluids and sufficiently well-mixed multiphase fluids.

In some applications, an "active" SONAR meter can be used to measure volumetric fluid flow rate within a pipe. An active SONAR meter utilizes an array of sensors (e.g., ultrasonic transducers) that transmit a signal into the fluid flow and measure the transit time (i.e., time of flight (TOF) or phase modulation) of the signal propagating through the fluid. Some active sensor arrays utilize transmitters and receivers disposed on opposing sides of the pipe, while others utilize transmitters and receivers disposed on the same side of the pipe. The signal transit time may be indicative of a coherent flow disturbance convecting with the fluid flow within the pipe. The velocity of the coherent flow disturbances through the array are indicative of the fluid flow velocity within the pipe, and therefore indicative of the volumetric fluid flow rate through the pipe.

Clamp-on SONAR based flow meters are typically able to provide a measure of the velocity at which coherent flow disturbances convect through the flow meter over a wide range of fluid flow conditions, including fluid flow that is not fully developed and is not well mixed. However, for these types of fluid flows, the relationship between the measured convective speed and the volumetric flow through the pipe becomes increasing more uncertain as the conditions depart from fully developed, well mixed, turbulent pipe flow conditions.

The ability to clamp-on and make a flow measurement is attractive for many applications for which more conventional in-line flow meters are either not available, or are impractical due to a wide range of reasons including high installation and/or maintenance costs. Additionally, clamp-on meters are often, due to necessity, installed on locations that: 1) do not have the desired upstream flow length required for fully developed flow profiles; and 2) have multiphase flows that are not well-mixed. Often, these non-ideal applications are the highest value applications for clamp-on SONAR meters due to the high cost of alternative means to measure the process flow.

Clamp-on flow measurement for surveillance of oil and gas wells is one such application. Clamp-on flow measurement is typically one or two orders of magnitude less costly than conventional well test separators. However, the accuracy of clamp-on well testing is often impaired due to an inability to ensure the fluid flow being sensed is both fully developed and well-mixed. For example, well piping often does not have the desired upstream flow lengths to ensure a fully-developed fluid flow, and typically fluid flow velocities are insufficient to ensure adequate mixing of constituents (e.g., oil, water, gas, etc.) within the fluid flow.

SUMMARY

It should be understood that any or all of the features or embodiments described herein can be used or combined in any combination with each and every other feature or embodiment described herein unless expressly noted otherwise.

According to an aspect of the present disclosure, a method of measuring a velocity or volumetric fluid flow rate of a fluid flow passing within a pipe includes determining a measured velocity or volumetric rate of a fluid flow passing within a pipe using a SONAR flow meter; producing a simulated velocity or volumetric rate of the fluid flow passing within the pipe using a CFD analysis device; producing at least one error function based on the measured velocity or volumetric fluid flow rate and the simulated velocity or volumetric fluid flow rate; and determining an adjusted velocity or volumetric fluid flow rate using the at least one error function and the measured velocity or volumetric fluid flow rate.

In any of the aspects or embodiments described above and herein, the steps of determining the measured velocity or volumetric fluid flow rate and producing the simulated velocity or volumetric fluid flow rate are performed for fluid flow conditions wherein the fluid flow is one or both of not fully developed or not well mixed.

In any of the aspects or embodiments described above and herein, the step of producing the simulated velocity or volumetric fluid flow rate includes inputting one or more fluid flow parameter values and iteratively adjusting the one or more fluid flow parameter values to decrease a magnitude of the at least one error function.

In any of the aspects or embodiments described above and herein, the one or more fluid flow parameter values include at least one of one or more fluid flow constituent flow rate values, one or more fluid flow constituent properties, or any combination thereof.

In any of the aspects or embodiments described above and herein, the step of determining the measured velocity or volumetric fluid flow rate using the SONAR flow meter includes measuring unsteady pressures relating to convective flow disturbances to determine a measured characteristic velocity of the convective flow disturbances. The step of producing the simulated velocity or volumetric fluid flow rate includes: determining a simulated characteristic velocity of the convective flow disturbances; determining a difference between the measured characteristic velocity and the simulated characteristic velocity; and adjusting a magnitude of the at least one error function to decrease the difference between the measured characteristic velocity and the simulated characteristic velocity.

In any of the aspects or embodiments described above and herein, the method further includes determining a measured fluid flow pressure drop across a length of the pipe and producing a simulated fluid flow pressure drop across the length of the pipe using the CFD analysis device. Producing at least one error function further includes using the measured fluid flow pressure drop and the simulated fluid flow pressure drop.

In any of the aspects or embodiments described above and herein, the step of determining the measured velocity or volumetric fluid flow rate using the SONAR flow meter includes determining the measured velocity or volumetric fluid flow rate using "N" number of SONAR flow meters, where "N" is an integer equal to or larger than two. The step of producing the at least one error function is based on the measured velocity or volumetric fluid flow rate from each of the "N" SONAR flow meters and the simulated velocity or volumetric fluid flow rate.

In any of the aspects or embodiments described above and herein, each of the "N" number of SONAR flow meters is associated with a respective length of the pipe. The method further includes determining a measured fluid flow pressure drop across a second respective length of the pipe and producing a simulated fluid flow pressure drop across the second respective length of the pipe. The step of producing the at least one error function is additionally based on the measured fluid flow pressure drop and the simulated fluid flow pressure drop.

In any of the aspects or embodiments described above and herein, the method further includes controlling the fluid flow passing within the pipe with a control valve based on the adjusted velocity or volumetric fluid flow rate.

According to another aspects of the present disclosure, a system for measuring a velocity or volumetric fluid flow rate of a fluid flow passing within a pipe includes a SONAR flow meter configured to determine a measured velocity or volumetric rate of a fluid flow passing within a pipe. The system further includes a CFD analysis device configured to produce a simulated velocity or volumetric rate of the fluid flow passing within the pipe. The system further includes a processing unit in communication with the CFD analysis device and the SONAR flow meter. The processing unit is configured to produce at least one error function based on the measured velocity or volumetric fluid flow rate and the simulated velocity or volumetric fluid flow rate, and is configured to determine an adjusted velocity or volumetric fluid flow rate using the at least one error function and the measured velocity or volumetric fluid flow rate.

In any of the aspects or embodiments described above and herein, the system further includes a first pressure detector disposed at an upstream end of a length of the pipe and a second pressure detector disposed at a downstream end of the length of the pipe. The first pressure detector and the second pressure detector are configured to determine a measured fluid flow pressure drop across the length of the pipe.

In any of the aspects or embodiments described above and herein, the CFD analysis device is configured to produce a simulated fluid flow pressure drop across the length of the pipe and the processing unit is configured to produce the at least one error function additionally based on the measured fluid flow pressure drop and the simulated fluid flow pressure drop.

In any of the aspects or embodiments described above and herein, the system further includes an intentional pressure loss device disposed within the pipe between the first pressure detector and the second pressure detector with respect to the fluid flow.

In any of the aspects or embodiments described above and herein, the intentional pressure loss device is a control valve.

In any of the aspects or embodiments described above and herein, the system further includes "N" number of SONAR flow meters configured to determine the measured velocity or volumetric rate of the fluid flow passing within the pipe, where "N" is an integer equal to or larger than two. The processing unit is configured to produce the at least one error function based on the measured velocity or volumetric fluid flow rate from each of the "N" SONAR flow meters and the simulated velocity or volumetric fluid flow rate.

In any of the aspects or embodiments described above and herein, each of the "N" number of SONAR flow meters is associated with a respective second length of the pipe.

In any of the aspects or embodiments described above and herein, the system further includes a plurality of pressure detectors including the first pressure detector and the second pressure detector. The plurality of pressure detectors is configured to determine the measured fluid flow pressure drop by performing "M" number of differential pressure measurements, where "M" is an integer equal to or larger than two. The CFD analysis device is configured to produce a simulated fluid flow pressure drop corresponding to each of the "M" number of differential pressure measurements. The processing unit is configured to produce the at least one error function using the measured fluid flow pressure drop and the simulated fluid flow pressure drop.

In any of the aspects or embodiments described above and herein, the CFD analysis device is configured to produce the simulated velocity or volumetric fluid flow rate by inputting one or more fluid flow parameter values and iteratively adjusting the one or more fluid flow parameter values to decrease a magnitude of the at least one error function.

In any of the aspects or embodiments described above and herein, the SONAR flow meter comprises multiple sensor arrays disposed around a full circumference of the pipe.

In any of the aspects or embodiments described above and herein, the SONAR flow meter comprises multiple sensor arrays disposed around a circumferential portion of the pipe which is less than a full circumference of the pipe.

The present disclosure, and all its aspects, embodiments and advantages associated therewith will become more readily apparent in view of the detailed description provided below, including the accompanying drawings.

DETAILED DESCRIPTION

According to an aspect of the present disclosure, a fluid flow metering system and method is provided which utilizes a SONAR fluid flow meter and a time-accurate Computational Fluid Dynamics (CFD) analysis device configured to resolve length scales associated with coherent flow disturbances convecting within a single phase fluid flow and/or a multiphase fluid flow traveling within a pipe. The CFD analysis device may be configured to simulate data representative of coherent flow disturbances sensed by a SONAR flow meter; e.g., unsteady pressure signals measured using a strain-based passive SONAR flow meter to determine a measured characteristic velocity of the convective flow disturbances. Thus, the CFD analysis device may produce simulated data corresponding to a determined simulated characteristic velocity of the convective flow disturbances. The simulated data may then be compared with data produced using a SONAR flow meter (i.e., "measured data") to define one or more error functions (or other compensation factors) that represent the difference between the simulated data and measured data. The present disclosure is not limited to any particular data form for comparison sake; e.g., data may be modeled and models compared, etc. Fluid flow parameters (e.g., fluid flow rates, etc.) that are input into the CFD analysis device may be iteratively updated to minimize an error function. Fluid flow parameters that are consistent with information assumed known about the process fluid, and that minimize the error function may be determined as a "best" solution (e.g., "best fit") for the fluid flow rates of the process fluid flow within the pipe.

Figure 1:
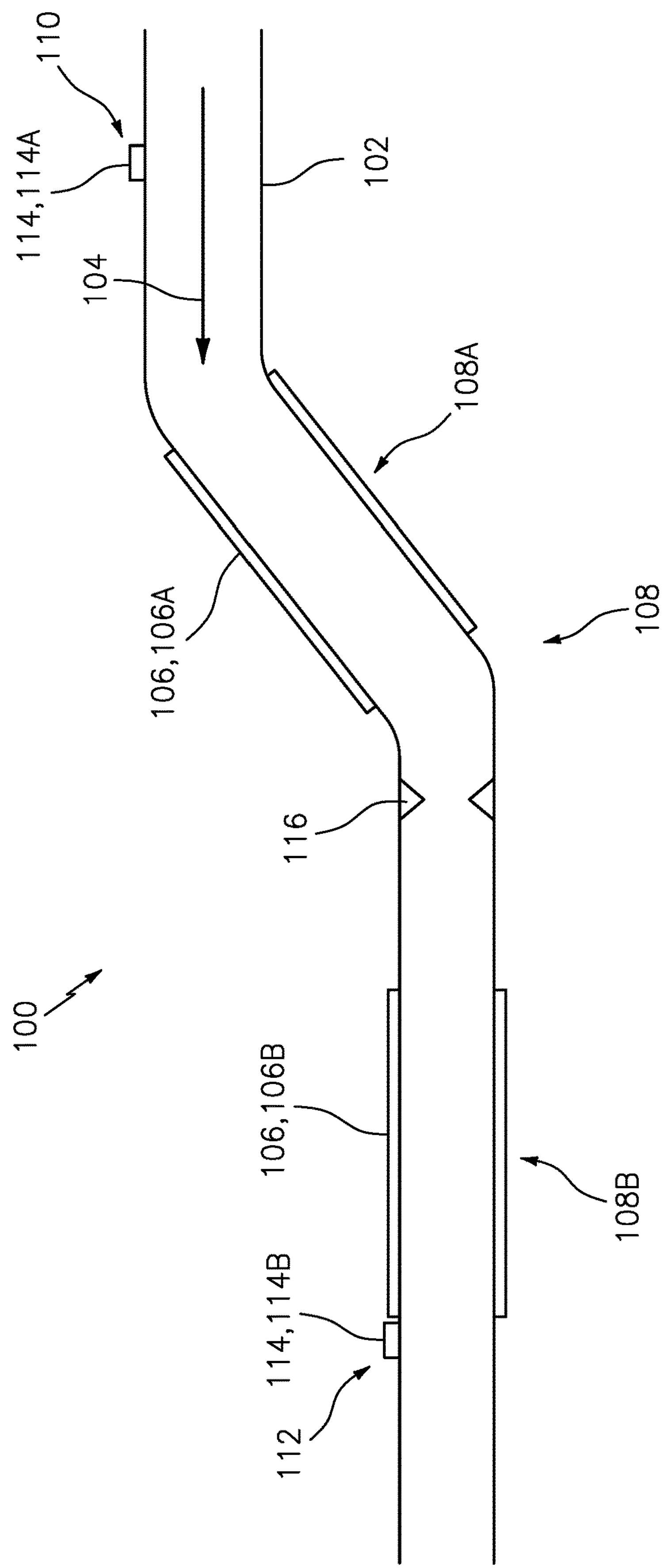
FIG. 1 schematically illustrates a fluid system, in accordance with one or more aspects of the present disclosure.
Figure 2:
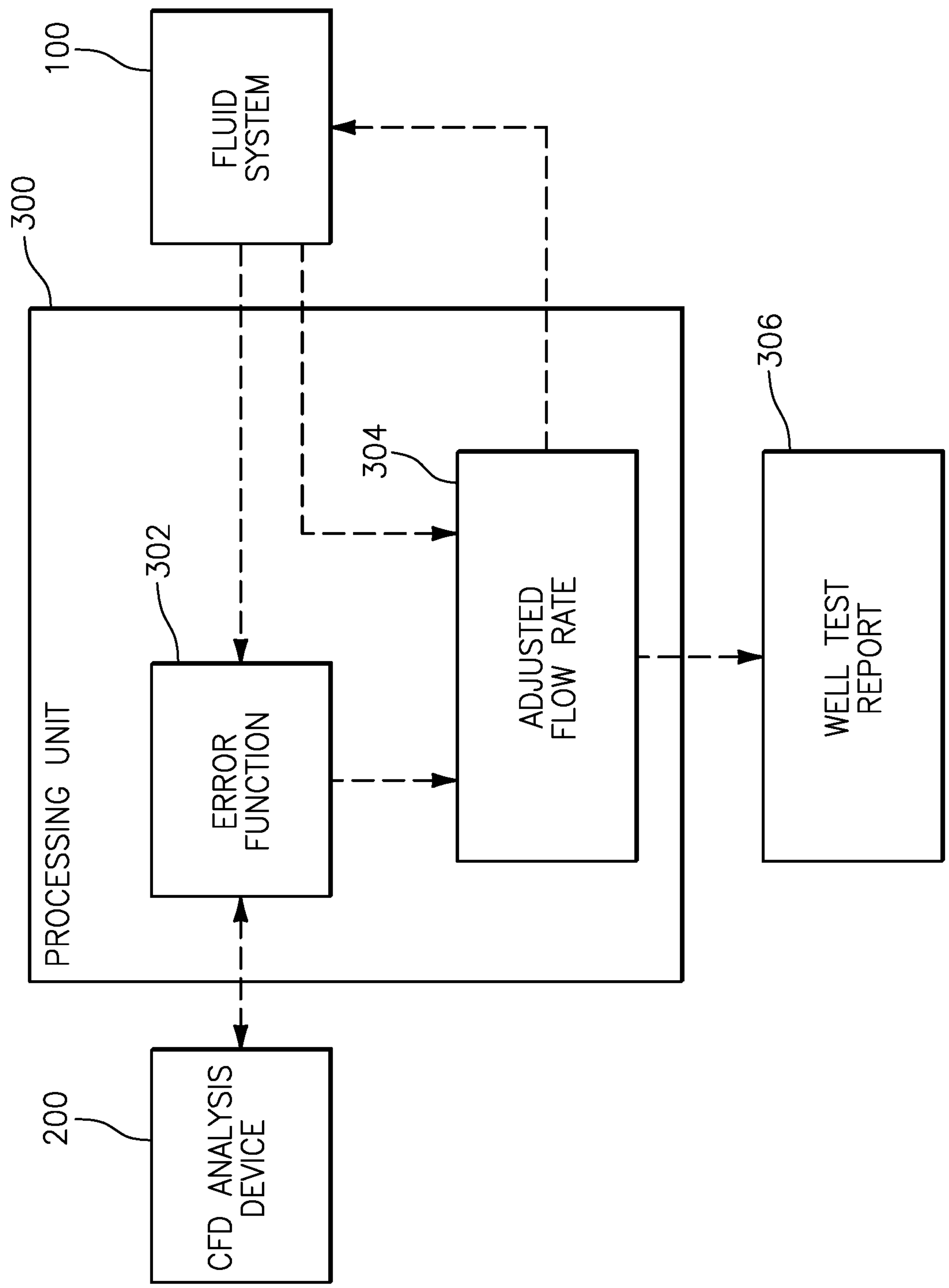
FIG. 2 illustrates a block diagram of flow measurement system, in accordance with one or more aspects of the present disclosure.
Figure 4:
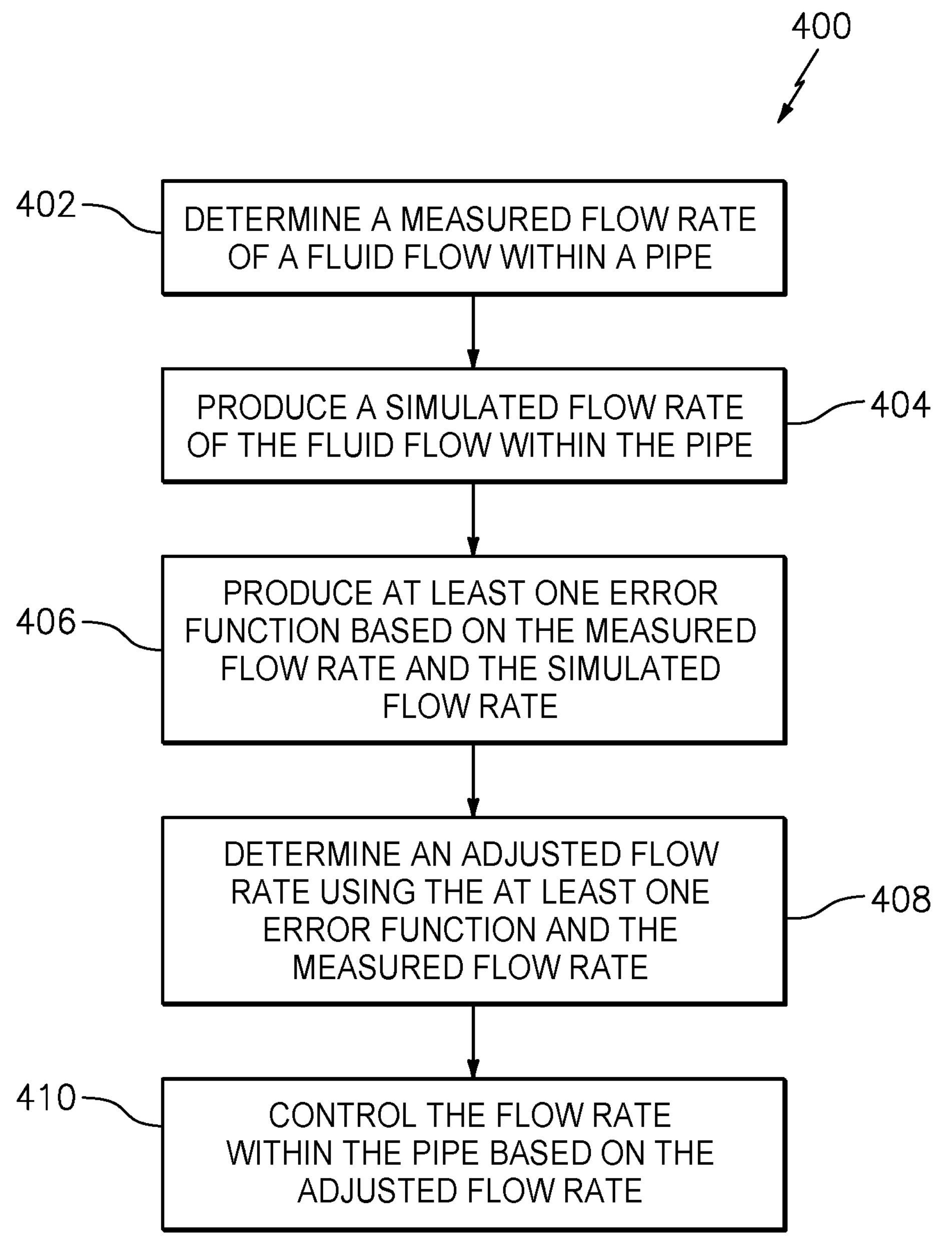
FIG. 4 illustrates a flow chart depicting a method of measuring a velocity or volumetric fluid flow rate of a fluid flow passing within a pipe, in accordance with one or more embodiments of the present disclosure.

Referring to FIGS. 1 and 4, an exemplary fluid system 100 is provided illustrating a fluid flow 104 passing within a pipe 102. In order to measure a velocity or volumetric fluid flow rate (hereinafter "flow rate") of the fluid flow 104 within the pipe 102, the fluid system 100 may include at least one SONAR flow meter 106 in communication with an exterior surface of the pipe 102 (Step 402 of Method 400). Aspects of the present disclosure are well-suited for, but not limited to, strain-based clamp-on SONAR flow meter multiphase fluid well testing. However, it should be understood that aspects of the present disclosure are also applicable to flow meters having alternative configurations. In various embodiments, the SONAR flow meter 106 may be disposed about a full circumference of the pipe 102 or may be limited to a circumferential region. The SONAR flow meter 106 may include multiple sensor arrays of full or limited circumferential extent over a same or similar axial location with respect to the orientation of the pipe 102. For example, sensor arrays of the SONAR flow meter 106 at the top and bottom of a horizontal section of the pipe 102 may provide a measured indication of the convective flow rate of the fluid flow 104 along the top and bottom of the pipe 102, which top and bottom portions of the fluid flow 104 can differ significantly for multiphase fluid flows.

As shown in FIG. 1, the at least one SONAR flow meter 106 may include a plurality of SONAR flow meters (e.g., "N" number of flow meters), such as a first SONAR flow meter 106A and a second SONAR flow meter 106B, configured to measure a flow rate of the fluid flow 104 at a respective plurality of positions along a length 108 of the pipe 102. For example, the first SONAR flow meter 106A may extend along a first sub-length 108A of the pipe 102 while the second SONAR flow meter 106B may extend along a second sub-length 108B of the pipe 102.

In various embodiments, the fluid system 100 may include a plurality of pressure detectors 114 configured to measure a pressure of the fluid flow 104 at a plurality of respective positions and, thereby, determine a differential pressure (e.g. a pressure drop) across the length 108 of the pipe 102. As shown, for example, in FIG. 1, the plurality of pressure detectors 114 may include a first pressure detector 114A located at a first end 110 (e.g., upstream end) of the length 108 of the pipe 102 and a second pressure detector 114B located at a second end 112 (e.g., downstream end) of the length 108 of the pipe 102. As shown, for example, in FIG. 1, the pressure detectors 114A, 114B may encompass one or more SONAR flow meters such as the SONAR flow meters 106A, 106B with respect to the fluid flow 104. However, in various embodiments, a first length of the pipe 102 may be associated with the SONAR flow meter 106, while a second length of the pipe 102, different than the first length of the pipe 102, may be associated with the plurality of pressure detectors. In various embodiments, the plurality of pressure detectors 114 may include greater than two pressure detectors such that the plurality of pressure detectors 114 is configured to perform "M" number of differential pressure measurements.

In various embodiments, the fluid system 100 may include an intentional pressure loss device such as, for example, a control valve 116, a venturi, or another device configured to cause a substantial decrease in fluid pressure at a position within the pipe 102. As shown in FIG. 1, the fluid system 100 may include the control valve 116 at a position along the length 108 of the pipe 102. In various embodiments, the control valve 116 may be located between the first SONAR flow meter 106A and the second SONAR flow meter 106B and/or between the first pressure detector 114A and the second pressure detector 114B, with respect to the fluid flow 104, however, no such configuration is required.

It should be understood that the illustrated fluid system 100 is provided for the purpose of describing the operation of the SONAR flow meter 106 and the plurality of pressure detectors 114 and that aspects of the present disclosure may be applicable to many different configurations of fluid systems. The illustrated length 108 of the pipe 102 may represent all or only a portion of a fluid system which may include additional flow meters, pressure detectors, control valves, pumps, etc.

Figure 3:
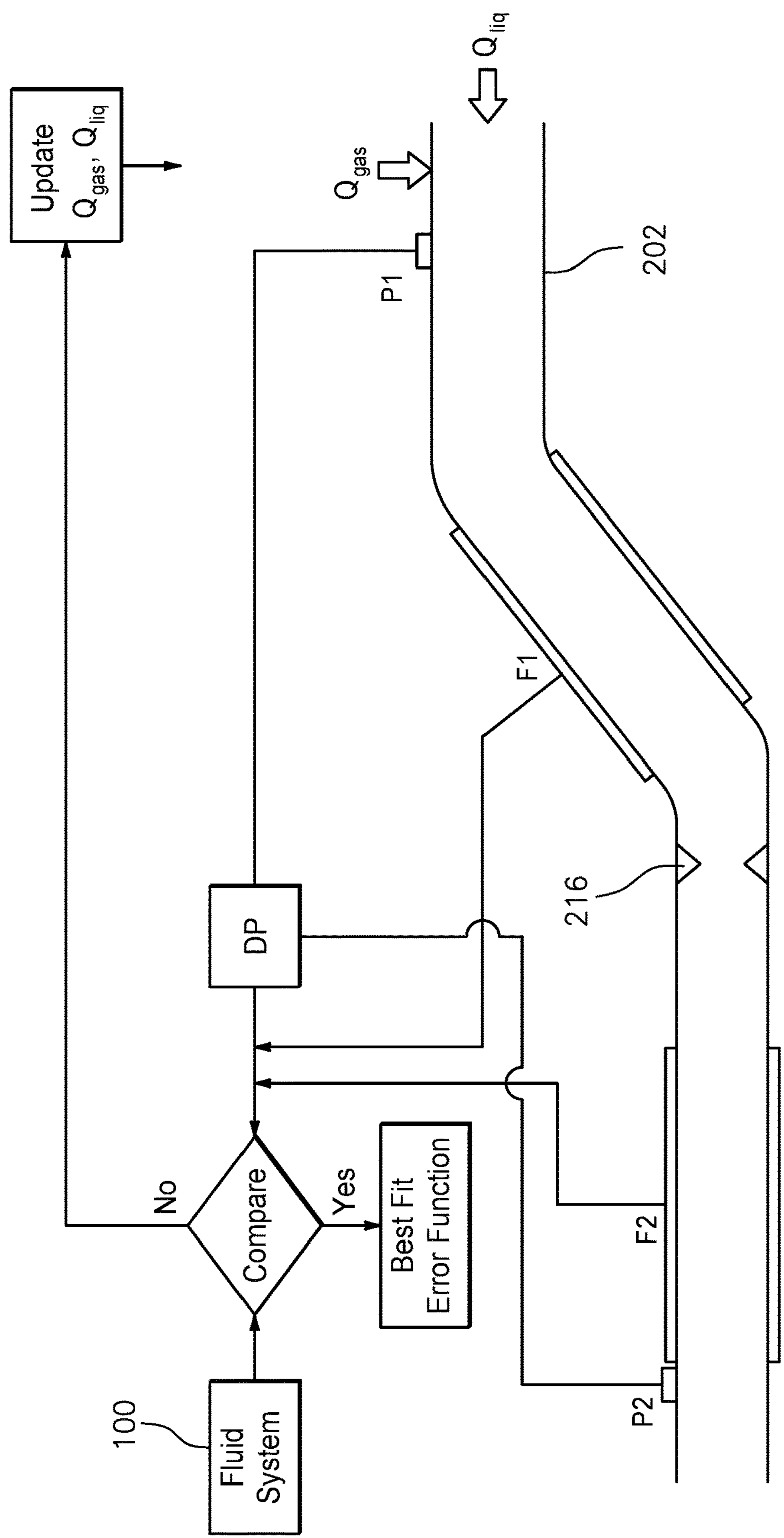
FIG. 3 illustrates a block diagram of flow measurement system including a simulated fluid system, in accordance with one or more aspects of the present disclosure.

Referring to FIGS. 1-4, a CFD analysis device 200 may be used to produce a time-resolved CFD simulated flow rate of the fluid flow 104 passing within the pipe 102 (Step 404 of Method 400). In other words, the CFD analysis device 200 may simulate the flow conditions associated with a fluid system, such as the fluid system 100 described above, to determine the simulated flow rate of the fluid flow 104 at one or more positions within a simulated pipe 202 corresponding to the pipe 102. As shown in FIG. 3, the CFD analysis device 200 may determine a simulated flow rate Fl, F2 for a fluid flow of the simulated pipe 202 at a pipe 202 location corresponding to a location of the SONAR flow meter 106, 106A, 106B with respect to the pipe 102. Similarly, the CFD analysis device 200 may determine simulated pressures P1, P2 for a fluid flow of the simulated pipe 202 at a pipe 202 location corresponding to a location of the plurality of pressure detectors 114, 114A, 114B with respect to the pipe 102. The CFD analysis device 200 may, therefore, determine a differential pressure DP across the simulated pipe 202 length.

The system may include a processing unit 300 configured to perform an algorithm described herein and/or effect operation of some or all of the devices described herein. The processing unit 300 may include any type of computing device, computational circuit, or any type of process or processing circuit capable of executing a series of instructions that are stored in memory. The processing unit may include multiple processors and/or multicore CPUs and may include any type of processor, such as a microprocessor, digital signal processor, microcontroller, or the like. In some embodiments, the CFD analysis device 200 may be integral with the processing unit 300. In some embodiments, the CFD analysis device 200 may be independent of, but in communication with, the processing unit 300. In some embodiments, the CFD analysis device 200 may be integral with the SONAR flow meter 106 and/or the plurality of pressure detectors 114. In some embodiments, the CFD analysis device 200 may be independent of, but in communication with, the SONAR flow meter 106 and/or the plurality of pressure detectors 114. In some embodiments, the processing unit 300 may be integral with the SONAR flow meter 106 and/or the plurality of pressure detectors 114. In some embodiments, the processing unit 300 may be independent of, but in communication with, the SONAR flow meter 106 and/or the plurality of pressure detectors 114.

In some embodiments, aspects of the present disclosure may allow the processing unit 300 to utilize a measured velocity of convective flow disturbances, determined by the SONAR flow meter 106, and a simulated velocity of convective flow disturbances, determined using the CFD analysis device 200, to define an error function 302, as shown below in Equation-1 (Step 406 of Method 400). The measured and simulated velocities may, in turn, be used to determine respective measured and simulated volumetric flow rates of the fluid flow 104. As shown, for example, in FIG. 3, fluid flow parameter values such as one or more constituent flow rate values of oil, water and gas within the fluid flow (e.g., $Q_{gas}$, $Q_{liq}$), one or more fluid flow constituent properties (e.g., density, temperature, etc.), or any combination thereof, initially input into the CFD analysis device 200, may be iteratively adjusted to decrease a magnitude of the error function 302. The aforesaid fluid flow parameters may be constrained to be consistent with other fluid flow parameters assumed to be known about the process fluid. These known parameters may be, for example, water cut, gas-oil ratio, produced oil, gas, and water properties.

$$\text{error}=\alpha_1(V_{sonar_{measured}}-V_{sonar_{CFD}})^2 \quad \text{Equation 1}$$

The ability of the present disclosure to accurately determine multiphase flow rates may be improved further by incorporating more information in the optimization process. For example, pressure loss data representative of a pressure loss over a section of piping (e.g., the simulated differential pressure DP) may provide another basis to compare measured data versus simulated data (produced by the CFD analysis device 200) over a range of flow conditions. The pressure loss may or may not be produced by a simulated intentional pressure loss device 216 corresponding to the intentional pressure loss device (e.g., the control valve 116) of the fluid system 100. In various embodiments, the error function 302 can be defined to include contributions from 1) the difference in the measured and the CFD-simulated convection velocity and 2) the difference between the measured and CFD-simulated pressure drop over a section of the pipe 102, 202, as shown in Equation 2.

$$\text{error}=\alpha_1(V_{sonar_{measured}}-V_{sonar_{CFD}})^2+\alpha_2(DP_{measured}-DP_{CFD})^2 \quad \text{Equation 2}$$

The ability of the present disclosure to accurately determine fluid flow rates may also be improved further by utilizing a plurality of SONAR flow meters 106 at locations of the pipe with different operating conditions including pressure, cross sectional area, proximity to flow restrictions/expansion, and/or different flow orientation (i.e. flow upwards, downwards, horizontal, or any orientation in between). An example of an error function 302 for "N" SONAR meters 106 and "M" differential pressure measurements provided by the plurality of pressure detectors 114 (where "N" and "M" are integers, equal to or larger than two, that may or may not equal one another) is shown in Equation 3:

$$\text{error}=\sum_{i=1}^{N}\alpha_i\left(V_{sonar_{measured_i}}-V_{sonar_{CFD_i}}\right)^2+\sum_{j=1}^{M}\alpha_j\left(DP_{measured_j}-DP_{CFD_j}\right)^2 \quad \text{Equation 3}$$

Each different operating condition for which a SONAR flow meter 106 records and characterizes the unsteady pressure field and for which the CFD analysis device 200 simulates the unsteady pressure field becomes an additional comparison that can improve the fidelity of the interpretation.

Once the error function 302 has been determined by the processing unit 300, the processing unit 300 may further determine an adjusted flow rate 304 using the error function 302 and the measured flow rate provided by the SONAR flow meter 106 (Step 408 of Method 400). The error function 302 used to determine the adjusted flow rate 304 may be at least one error function, however, a plurality of unique error functions may be used to determine the adjusted flow rate 304. The error function 302 may be an initial error function, a "best fit" error function, or an error function corresponding to any number of iterations, as discussed above. The adjusted flow rate 304 may represent a more accurate measurement of the flow rate of the fluid flow 104 which accounts for undeveloped fluid flows and/or incomplete mixing of constituents (e.g., oil, water, gas, etc.) within the fluid flow 104. The adjusted flow rate 304 may, therefore, provide an improved ability to control the fluid flow 104 within the pipe 102 (Step 410 of Method 400). For example, the fluid flow 104 passing within the pipe 102 may be controlled based on the adjusted flow rate 304 by the control valve 116 and/or by one or more additional valves, pumps, or other flow control devices within the fluid system 100.

Time-resolved CFD simulations capable of simulating convective unsteady pressure fields with sufficient accuracy to be employed iteratively in the methods described herein may require significant computational resources. In various embodiments, it may be possible to produce the CFD simulated data substantially in real time with the measured data produced by the SONAR flow meter 106. However, it is also contemplated that the computational resources which may be necessary to produce the CFD simulated data may not be available contemporaneously with the measured data from the SONAR flow meter 106 for various reasons; e.g., location of the SONAR flow meter 106, the environment surrounding the SONAR flow meter 106, the amount of time required to produce the CFD simulated data, etc. In these instances, aspects of the present disclosure contemplate that the CFD simulated data may be produced non-contemporaneously with the measured data from the SONAR flow meter 106, and interpretation/analysis of the two may be performed as a process distinct from the collection of the measured data from the SONAR flow meter 106. This may be particularly true in those embodiments wherein multiple SONAR flow meters are utilized, each at a different pipe location having different operating conditions as described above.

Aspects of the present disclosure also contemplate that the aforesaid measurement of fluid flow parameters (convective flow disturbance velocities determined by the SONAR flow meter 106, fluid flow pressure measurements, etc.) may be performed at a first location (e.g., in the field) and the data representative of those measurement may be sent to a second location (e.g., a field office, etc.) remote from the first location, and the interpretation/analysis of the two data sets may be performed at the second location.

In these applications, fluid flow parameters may be recorded for a well operating in an essentially time-stationary manner (i.e., steady state production). Both the actual well production (i.e., the measured data) and CFD simulations will, in general, exhibit time-varying, yet time-stationary, conditions. The term "time-stationary" used herein refers to processes that have sufficiently constant time averaged properties. For example, a well could exhibit somewhat random or periodic flow parameter variations on a short time scale, for example several seconds or minutes, but the same flow parameter value may be essentially constant when viewed over a longer period of time such as a day or a week. For these conditions, time averaged values of the measured and simulated SONAR and/or differential pressure data can be used for the optimization process. The recorded data and any information regarding any known aspects of the fluid flow (e.g., water cut, oil-gas ratio, etc.) may be supplied, along with the pipe 102 geometry for post-processing to implement the CFD based optimized interpretation of the measured data in terms of gas, oil and water rates.

One or more of the fluid properties, pipe geometry, piping geometry, and an initial estimate of the multiphase flow rates (and any other applicable parameters) may then be used to produce at least an initial CFD simulation, which in turn may be used to produce at least an initial error function 302. Fluid flow parameters (e.g., gas, oil, and water flow rates, etc.) along with other unknown parameters may then be varied using an optimization algorithm to minimize the error function 302. The fluid flow parameters (e.g., gas, oil, and water flow rates, etc.) that decrease the error function to an acceptable form (e.g., minimize the error function) represent the "best fit" of the SONAR flow meter 106 and other information in terms of the oil, water, and gas flow rates. The results of the optimization may be reported via a "well test report" 306. Aspects of the present disclosure may be applied to any single or multiphase flow through any piping network.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of measuring a velocity or volumetric fluid flow rate of a fluid flow passing within a pipe, comprising:

determining a measured velocity or volumetric rate of a fluid flow passing within a pipe using a SONAR flow meter, and measuring unsteady pressures relating to convective flow disturbances to determine a measured characteristic velocity of the convective flow disturbances;

producing a simulated velocity or volumetric rate of the fluid flow passing within the pipe using a computational fluid dynamics (CFD) analysis device, the producing the simulated velocity or volumetric rate including determining a simulated characteristic velocity of the convective flow disturbances and determining a difference between the measured characteristic velocity and the simulated characteristic velocity;

producing at least one error function based on the measured velocity or volumetric fluid flow rate and the simulated velocity or volumetric fluid flow rate, and adjusting a magnitude of the at least one error function to decrease the difference between the measured characteristic velocity and the simulated characteristic velocity; and determining an adjusted velocity or volumetric fluid flow rate using the at least one error function and the measured velocity or volumetric fluid flow rate.

2. The method of claim 1, wherein the steps of determining the measured velocity or volumetric fluid flow rate and producing the simulated velocity or volumetric fluid flow rate are performed for fluid flow conditions wherein the fluid flow is one or both of not fully developed or not well mixed.

3. The method of claim 2, wherein the step of producing the simulated velocity or volumetric fluid flow rate includes inputting one or more fluid flow parameter values and iteratively adjusting the one or more fluid flow parameter values to decrease a magnitude of the at least one error function.

4. The method of claim 3, wherein the one or more fluid flow parameter values include at least one of one or more fluid flow constituent flow rate values, one or more fluid flow constituent properties, or any combination thereof.

5. The method of claim 1, further comprising:
determining a measured fluid flow pressure drop across a length of the pipe; and
producing a simulated fluid flow pressure drop across the length of the pipe using the CFD analysis device;
wherein producing at least one error function further includes using the measured fluid flow pressure drop and the simulated fluid flow pressure drop.

6. The method of claim 1, wherein the step of determining the measured velocity or volumetric fluid flow rate using the SONAR flow meter includes determining the measured velocity or volumetric fluid flow rate using "N" number of SONAR flow meters, where "N" is an integer equal to or larger than two; and
wherein the step of producing the at least one error function is based on the measured velocity or volumetric fluid flow rate from each of the "N" number of SONAR flow meters and the simulated velocity or volumetric fluid flow rate.

7. The method of claim 6, wherein each of the "N" number of SONAR flow meters is associated with a respective length of the pipe; the method further comprising:
determining a measured fluid flow pressure drop across a second respective length of the pipe; and
producing a simulated fluid flow pressure drop across the second respective length of the pipe;
wherein the step of producing the at least one error function is additionally based on the measured fluid flow pressure drop and the simulated fluid flow pressure drop.

8. The method of claim 1, further comprising controlling the fluid flow passing within the pipe with a control valve based on the adjusted velocity or volumetric fluid flow rate.

9. A system for measuring a velocity or volumetric fluid flow rate of a fluid flow passing within a pipe, comprising:
a SONAR flow meter configured to determine a measured velocity or volumetric rate of a fluid flow passing within a pipe, wherein the determination includes measuring unsteady pressures relating to convective flow disturbances to determine a measured characteristic velocity of the convective flow disturbances;
a computational fluid dynamics (CFD) analysis device configured to produce a simulated velocity or volumetric rate of the fluid flow passing within the pipe, including a simulated characteristic velocity of the convective flow disturbances; and
a processing unit in communication with the CFD analysis device and the SONAR flow meter, the processing unit configured to produce at least one error function based on the measured velocity or volumetric fluid flow rate and the simulated velocity or volumetric fluid flow rate, including a difference between the measured characteristic velocity and the simulated characteristic velocity, and configured to determine an adjusted velocity or volumetric fluid flow rate using the at least one error function and the measured velocity or volumetric fluid flow rate, and configured to adjust a magnitude of the at least one error function to decrease the difference between the measured characteristic velocity and the simulated characteristic velocity.

10. The system of claim 9, further comprising:
a first pressure detector disposed at an upstream end of a length of the pipe; and
a second pressure detector disposed at a downstream end of the length of the pipe;
wherein the first pressure detector and the second pressure detector are configured to determine a measured fluid flow pressure drop across the length of the pipe.

11. The system of claim 10, wherein the CFD analysis device is configured to produce a simulated fluid flow pressure drop across the length of the pipe and the processing unit is configured to produce the at least one error function additionally based on the measured fluid flow pressure drop and the simulated fluid flow pressure drop.

12. The system of claim 11, further comprising an intentional pressure loss device disposed within the pipe between the first pressure detector and the second pressure detector with respect to the fluid flow.

13. The system of claim 12, wherein the intentional pressure loss device is a control valve.

14. The system of claim 10, further comprising "N" number of SONAR flow meters configured to determine the measured velocity or volumetric rate of the fluid flow passing within the pipe, where "N" is an integer equal to or larger than two;
wherein the processing unit is configured to produce the at least one error function based on the measured velocity or volumetric fluid flow rate from each of the "N" number of SONAR flow meters and the simulated velocity or volumetric fluid flow rate.

15. The system of claim 14, wherein each of the "N" number of SONAR flow meters is associated with a respective second length of the pipe.

16. The system of claim 15, further comprising a plurality of pressure detectors including the first pressure detector and the second pressure detector, the plurality of pressure detectors configured to determine the measured fluid flow pressure drop by performing "M" number of differential pressure measurements, where "M" is an integer equal to or larger than two;
wherein the CFD analysis device is configured to produce a simulated fluid flow pressure drop corresponding to each of the "M" number of differential pressure measurements; and
wherein the processing unit is configured to produce the at least one error function using the measured fluid flow pressure drop and the simulated fluid flow pressure drop.

17. The system of claim 9, wherein the CFD analysis device is configured to produce the simulated velocity or volumetric fluid flow rate by inputting one or more fluid flow parameter values and iteratively adjusting the one or more fluid flow parameter values to decrease the magnitude of the at least one error function.

18. The system of claim 9, wherein the SONAR flow meter comprises multiple sensor arrays disposed around a full circumference of the pipe.

19. The system of claim 9, wherein the SONAR flow meter comprises multiple sensor arrays disposed around a circumferential portion of the pipe which is less than a full circumference of the pipe.

* * * * *